(12) United States Patent
Walter (10) Patent No.: US 8,607,272 B2
(45) Date of Patent: Dec. 10, 2013

(54) NEAR-REAL TIME INTERNET PROTOCOL TELEVISION

(75) Inventor: Edward Walter, Boerne, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 348 days.

(21) Appl. No.: 12/608,651

(22) Filed: Oct. 29, 2009

(65) Prior Publication Data

US 2011/0107372 A1  May 5, 2011

(51) Int. Cl.
*G06F 13/00* (2006.01)

(52) U.S. Cl.
USPC .................. 725/39; 725/38; 725/58; 725/59

(58) Field of Classification Search
None
See application file for complete search history.

(56) References Cited

U.S. PATENT DOCUMENTS

| | | | |
|---|---|---|---|
| 5,517,232 A | 5/1996 | Heidemann et al. | |
| 5,557,316 A | 9/1996 | Hoarty et al. | |
| 5,751,282 A | 5/1998 | Girard et al. | |
| 7,024,678 B2 | 4/2006 | Gordon et al. | |
| 2003/0177495 A1 * | 9/2003 | Needham et al. | 725/55 |
| 2003/0237097 A1 * | 12/2003 | Marshall et al. | 725/105 |
| 2008/0134258 A1 * | 6/2008 | Goose et al. | 725/91 |
| 2010/0115596 A1 * | 5/2010 | Horozov et al. | 726/7 |
| 2011/0083154 A1 * | 4/2011 | Boersma | 725/109 |
| 2012/0266193 A1 * | 10/2012 | Ellis et al. | 725/46 |
| 2012/0315021 A1 * | 12/2012 | Schwesinger et al. | 386/292 |

* cited by examiner

*Primary Examiner* — Brian Pendleton
*Assistant Examiner* — Jean D Saint Cyr
(74) *Attorney, Agent, or Firm* — Guntin & Gust, PLC; Douglas Schnabel (57) ABSTRACT

A set top box includes a processor configured to provide an electronic programming guide to available television programming. The available television programming includes previously-aired content, currently-airing content, and to-be-aired content. The processor is further configured to receive a selection indicating selected content, and determine if the selected content is previously aired content, currently airing content, or to-be-aired content. The processor is still further configured to request the selected content from a distribution server when the selected content is previously aired content, and provide playback of the selected content.

15 Claims, 6 Drawing Sheets

NEAR-REAL TIME INTERNET PROTOCOL TELEVISION

FIELD OF THE DISCLOSURE

The present disclosure generally relates to communications networks, and more particularly relates to systems and methods for providing near-real time Internet Protocol television (IPTV).

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
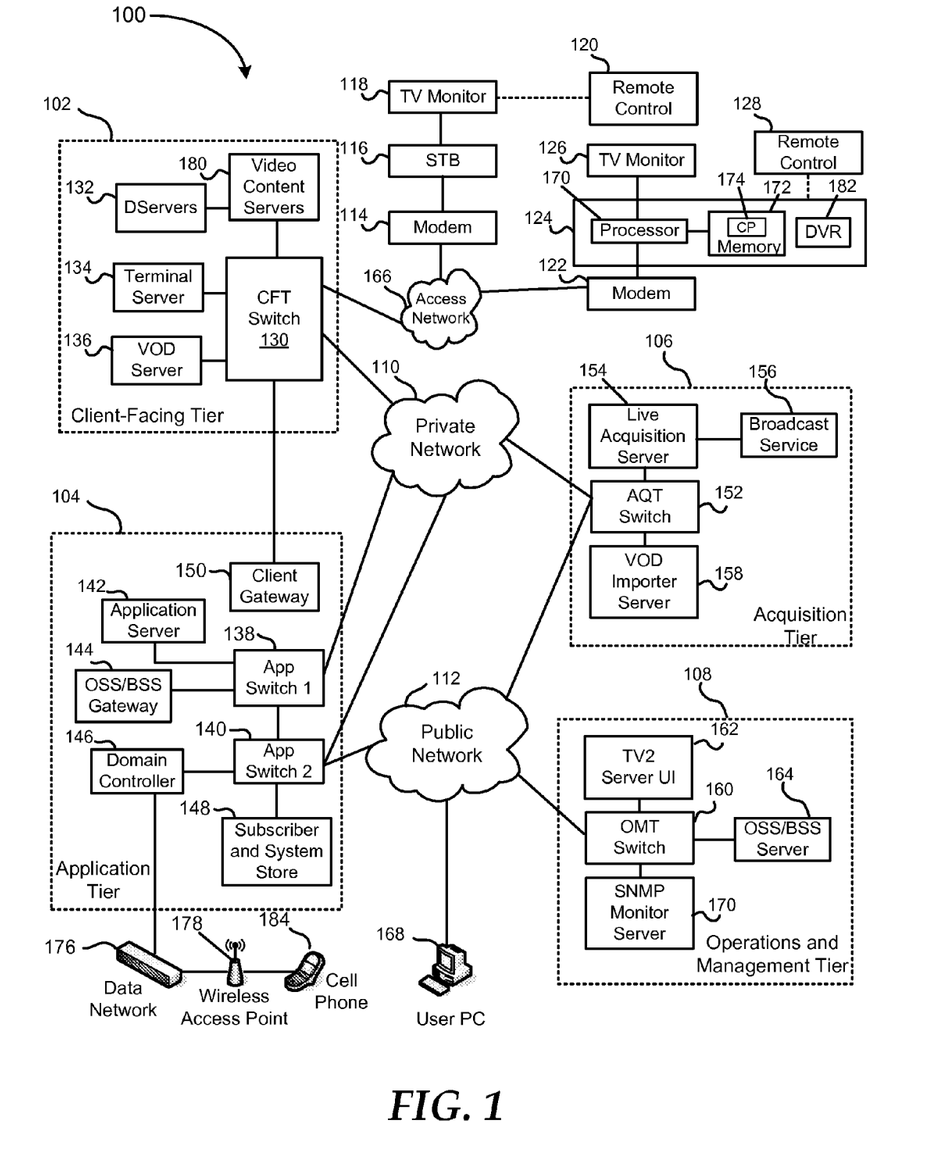
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
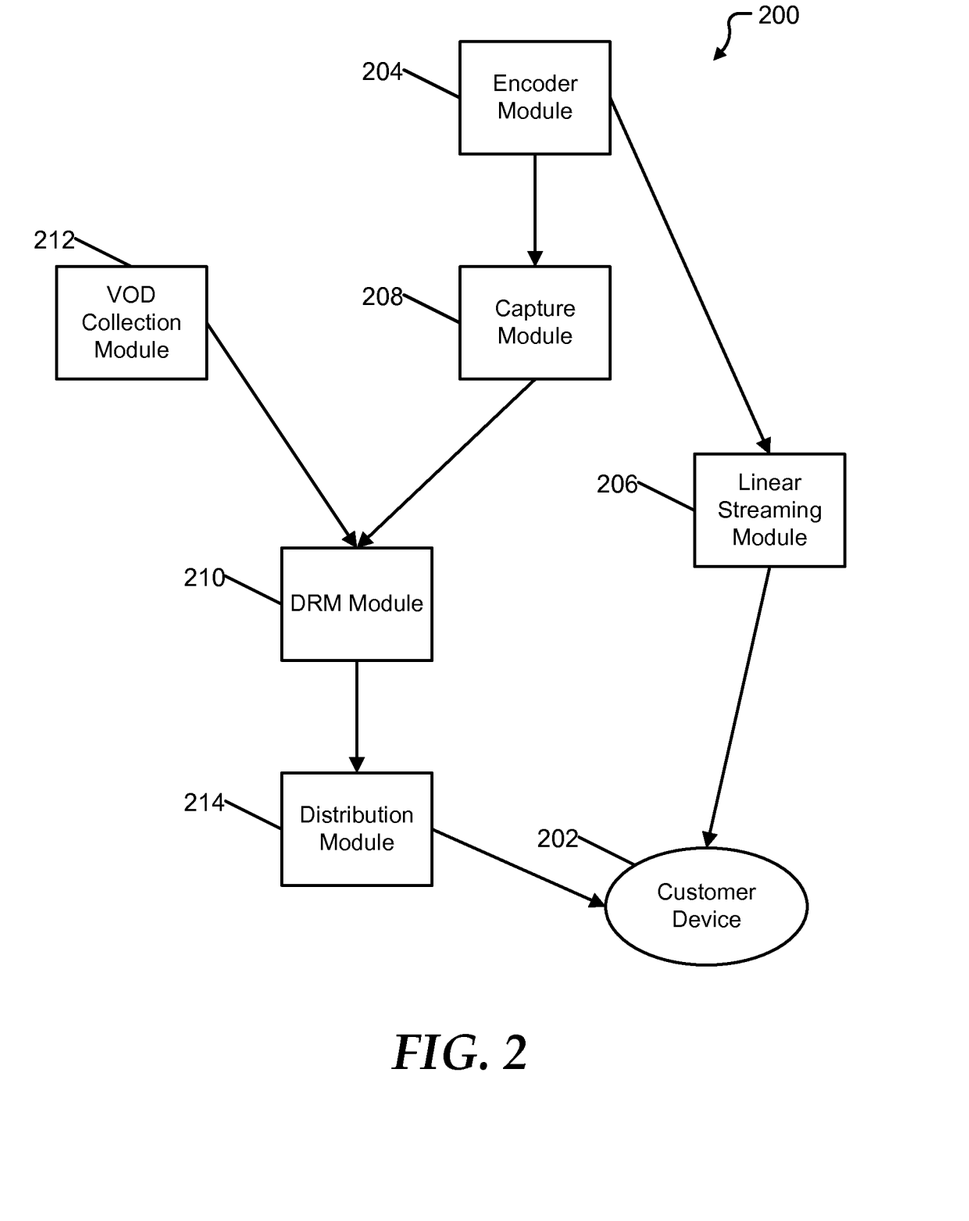
FIG. 2 is a block diagram illustrating an exemplary system for near-real time on-demand distribution of linear programming.

FIG. 2 shows an exemplary embodiment of a system 200 that can be used in conjunction with an IPTV system, such as IPTV system 100, for providing near-real time on-demand distribution of linear programming to a customer device 202, such as STB 116. System 200 can include an Encoder Module 204 for receiving and encoding linear programming from a content provider. Linear programming can include content such as broadcast television content that is typically available for the users to watch only at a specific date and time and provided to the customer device through a broadcast or multicast mechanism. The linear programming can be received through various transport methods including satellite, terrestrial, and over-the-air. Encoder Module 204 can provide the encoded linear content to Linear Streaming Module 206 and encoded near-real time content to Capture Module 208. Near-real time content can include content such as broadcast television content that is provided to the customer device on demand, such as through a unicast mechanism. The near-real time content can be made available on demand concurrently with the broadcast of the content. Advantageously, the near-real time content can be retrieved Linear Streaming Module 206 can apply digital rights management (DRM) for streaming linear content to the linear content, and provide the content to a plurality of customer devices 202 using a real-time multicast stream of the content. DRM for streaming linear content can include rights for viewing the linear stream for a period of time, such as for a number of hours or days.

Capture Module 208 can store the near-real time content. DRM Module 210 can apply DRM for on-demand distribution to the stored near-real time content. Additionally, VOD Collection Module 212 can receive VOD content from a VOD content provider and DRM Module 210 can apply DRM for on-demand distribution of the VOD content. VOD content can include content, such as movies, that is provided for the purpose of on-demand viewing and is available through an on-demand delivery mechanism, such as unicast distribution. In contrast to the DRM for streaming linear content, the DRM for on-demand distribution can include rights for a piece of content, such as a television show or movie. The rights can allow viewing of the piece of content repeatedly. Repeated viewing may be unrestricted or limited to a number of hours or days.

DRM Module 210 can provide the near-real time content or the VOD content to Distribution Module 214. Distribution Module 214 can make the near-real time and VOD content available to customer device 202 through the IPTV network. In an embodiment, Distribution Module 214 can make the near-real time and VOD content available to additional customer devices, such as computers and smart phones, through additional networks such as the Internet or cellular network.

Customer Device 202 can request the near-real time or VOD content on demand. For example, a customer device 202 can send a request for near-real time content that was scheduled to air in the past. The Distribution Module 214 can provide the near-real time content to the customer device 202. The near-real time content may be provided after a short delay as a result of encoding and distribution. The near-real time content may be individually streamed to the customer device 202 without utilizing a multicast stream. Additionally, when sufficient bandwidth is available and the customer device is receiving content that was previously-aired, the near-real time content can be provided to the customer device 202 at a higher than real time rate. As a result, the customer device 202 can receive the complete content earlier, freeing up future network bandwidth. Additionally, the faster-than-real time content stream can be more resilient to temporary network disruptions because playback can continue with previously received content while the temporary network disruption is resolved.

The previously discussed modules can be implemented in hardware, software, or any combination thereof. Each module may include one or more computer systems. When a module includes more than one computer system, the functions of the module can be distributed across the multiple computer systems in a symmetric manner, that is each computer system performs the same type of tasks, or in an asymmetric manner, that is two computer systems of the module may perform different tasks.

Figure 3:
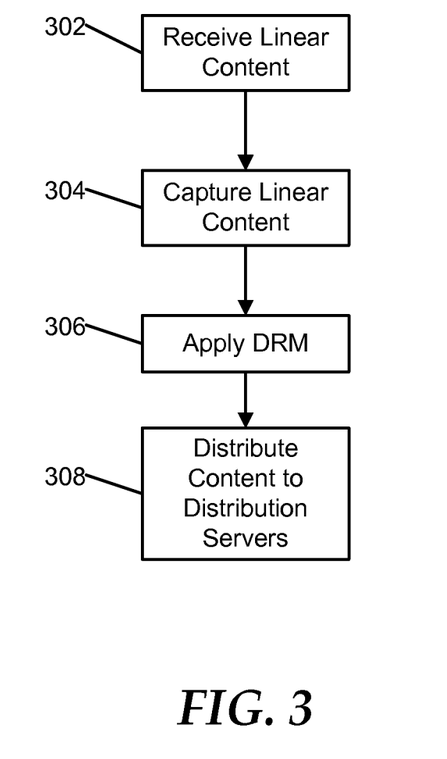
FIG. 3 is a flow diagram illustrating an exemplary method for providing on-demand linear programming in near-real time.

FIG. 3 shows a flow diagram illustrating an exemplary method of providing near-real time content on demand. At 302, a system, such as system 200, can receive linear content. A linear content provider, such as a television network, cable network, or local television station, can provide the linear content. The content can be provided via satellite distribution, over-the-air distribution, or terrestrial distribution. At 304, the system can capture the linear content. Capturing the content can include encoding the content for on-demand distribution and storing the content. At 306, the system can apply DRM to the captured content. The DRM can include an on-demand DRM scheme.

At 308, the system can distribute the captured content to distribution servers located throughout a network. The distribution servers can be located close to customer devices or at a central location. Which distribution servers store the capture content can be based upon the popularity of the content, the age of the content, or other factors. For example, recent content, such as content aired in the last day, can be located at substantially all of the distribution servers located close to customer devices. Old content, such as content aired at least a week ago, can be located at some distribution servers located close to customer devices and at centrally located distribution servers. Very old content, such as content aired over a month ago, can be located primarily at centrally located distribution servers and at substantially no distribution servers located close to customer devices.

In an embodiment, the system may not store an additional instance of content that was previously aired. For example, a television network may air a movie or a television episode repeatedly over one or more days. The system may detect when the movie or television episode is repeated and may halt capture of the repeated content or distribution of the content to the distribution servers.

Figure 4:
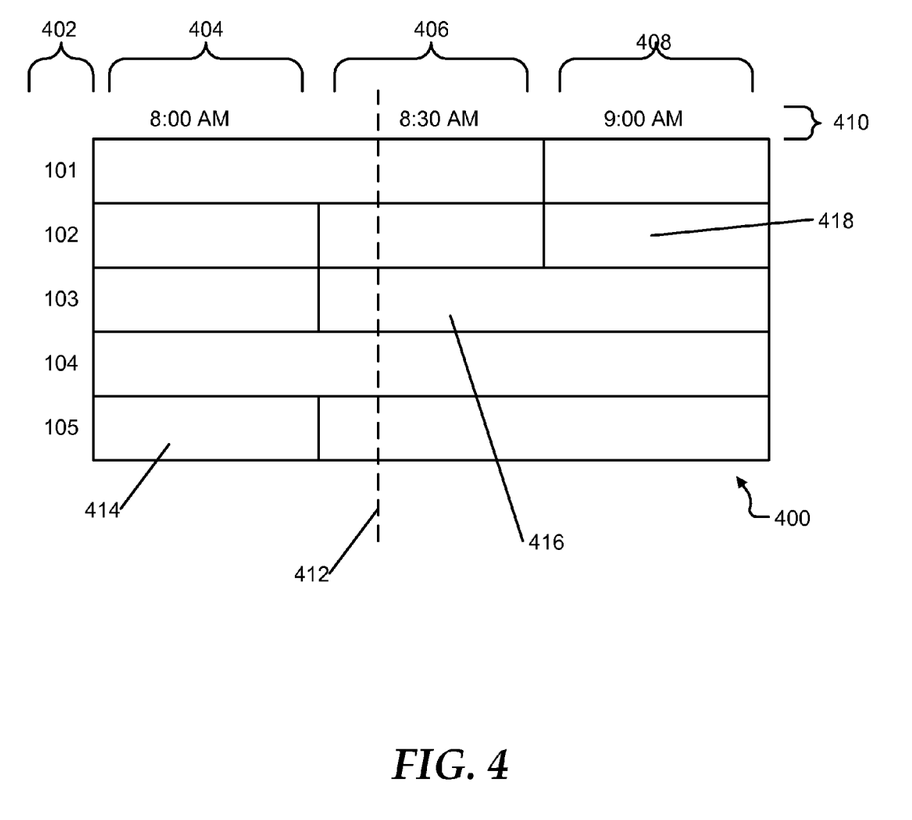
FIG. 4 is a flow diagram of an exemplary method for accessing linear programming on-demand.

FIG. 4 shows a schematic view of an exemplary embodiment of an electronic programming guide (EPG) 400 for on-demand access to linear programming. The EPG 400 provides television viewers with on-screen television schedule information. EPG 400 may be displayed along with additional information, such as advertisements, detailed content descriptions, content, or any combination thereof. The programming information is preferably displayed in a grid format, including columns 402, 404, 406, and 408. Column 402 can display the various channels. The list of channels may include all channels available, only those channels to which the viewer is subscribed, or a subset of favorite channels preselected by the viewer. Columns 404, 406, and 408 can indicate what is scheduled on the channels listed in column 402 in half hour increments. For example, titles of content can be displayed within the columns 404, 406, and 408. Additionally, a brief description of the content may be displayed. For content spanning multiple half hour increments, the title and description may be displayed across more than one of columns 404, 406, and 408. Additionally, in a particular embodiment, the EPG 400 can also indicate content that is stored, such as by adding a recorded symbol adjacent to titles of content shown within columns 404, 406, and 408. The time corresponding to the half hour increments can be displayed in a row 410 across the top of EPG 400. Typically, more channels are available than can be shown at one time. Accordingly, the grid may be scrolled up or down through additional channels. Further, a viewer may scroll the grid to the left or right to view content choices at different times.

In an embodiment, the viewer may access the EPG 400 at a current time indicated by the dashed line 412. The EPG 400 can display information about previously aired content 414, currently airing content 416, and to-be-aired content 418. If the viewer selects previously aired content 414, the customer device can request stored content for immediate playback from a distribution server, such as distribution module 214. The distribution server can provide the content from the start of the content. In a particular embodiment, the customer device can determine if the content is stored locally before retrieving the content from the distribution server. When the content is stored locally, the customer device can provide playback of the selected content without retrieving the content from the distribution server.

If the viewer selects currently airing content 416, the customer device can either request stored content to provide playback from the start of the currently airing content 416 or receiving the content for playback from the current time. Playback from the current time may be provided by receiving streaming linear content or retrieving stored content indexed to the current time from a distribution server.

If the viewer selects to-be-aired content, the customer device can search for similar content that is currently available, such as previously aired near-real time content or VOD content, or can schedule an event. The event can include recording the to-be-aired content during airing of the content, setting a reminder for viewing the content, automatically switching to the content when it is scheduled to air, or any combination thereof. If similar content is currently available, the customer device can provide an option to retrieve the similar content for immediate playback.

Figure 5:
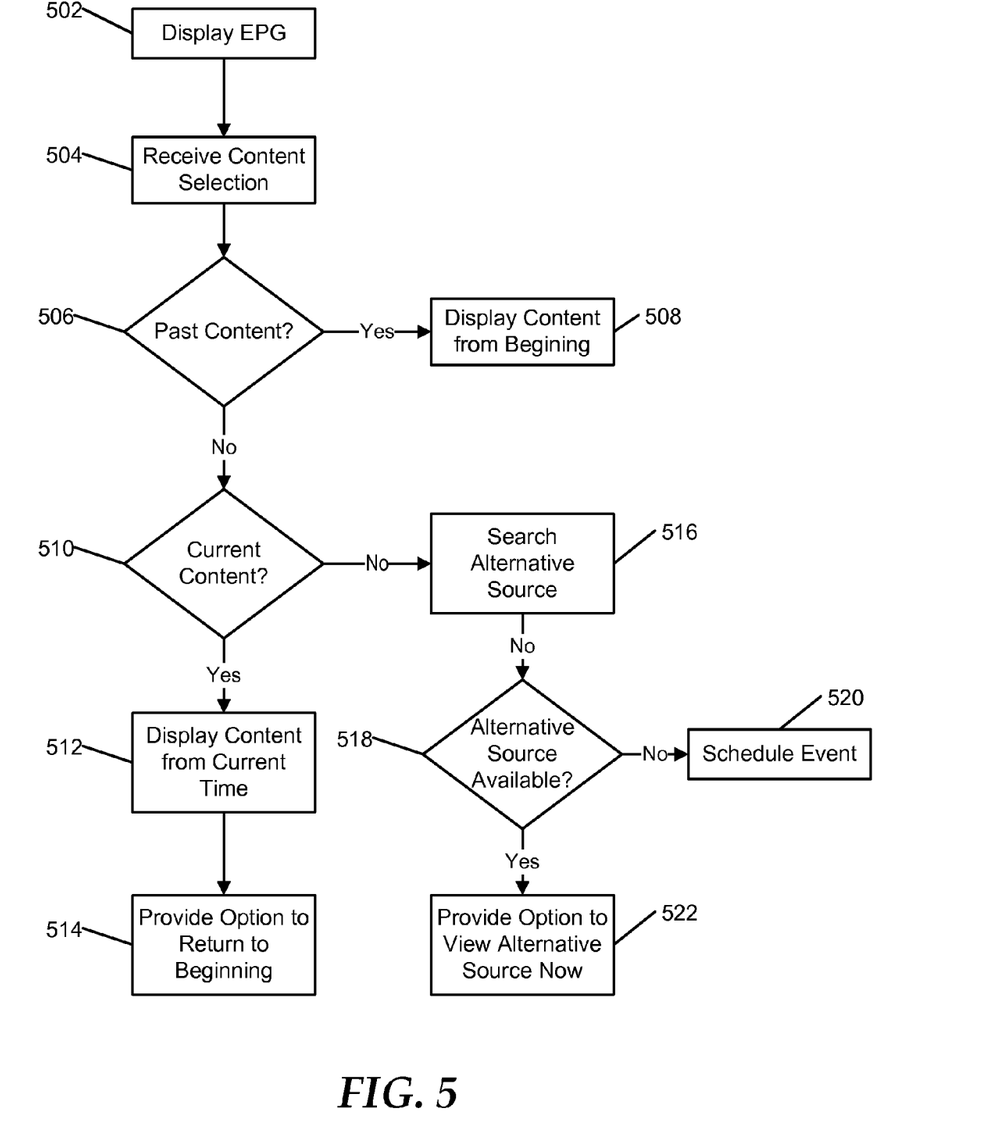
FIG. 5 is a schematic diagram of an exemplary embodiment of an electronic programming guide for on-demand access to linear programming.

FIG. 5 shows a flow diagram illustrating an exemplary method for accessing linear programming on-demand. At 502, a customer device, such as STB 116, can display an EPG. Using the EPG, a viewer can access information about available content and content that is scheduled to be aired. Additionally, the viewer can select content for playback from the EPG. At 504, the customer device can receive the content selection. At 506, the customer device can determine if the selected content is past content. Past content can include previously aired content that may be stored for on-demand viewing. When the selected content is past content, the customer device can retrieve the selected content and begin playback of the content from the beginning, as illustrated at 508.

Alternatively, when the selected content is not past content, the customer device can determine if the content is current content, as illustrated at 510. Current content can be currently airing content. Additionally, a portion of the current content can be stored for on-demand viewing. At 512, when the selected content is current content, the customer device can initiate playback of the content from the current time. At 514, the customer device can provide an option for returning to earlier portion of the selected content to restart playback. For example, the viewer can select to rewind by pressing a rewind button on the customer device or a remote. In another example, the viewer may issue a command to the customer device to display a menu with an option to restart the selected content. In an alternate embodiment, the customer device may be optionally configured to always start playback of the current content from the beginning.

Returning to 510, when the selected content is not current content indicating that the selected content is to-be-aired content, the customer device can search for an alternate source for the content, as illustrated at 516. An alternate source can include VOD content, an earlier broadcast of the content that is stored for on-demand viewing, or other sources. At 518, the customer device can determine if an alternate source is available. When an alternate source is not available, the customer device can schedule an event, as illustrated at 520. The event can include recording the to-be-aired content during airing of the content, setting a reminder for viewing the content, automatically switching to the content when it is scheduled to air, or any combination thereof. Alternatively, when an alternate source is available, the customer device can provide an option to view the content from the alternate source, as illustrated at 522.

Figure 6:
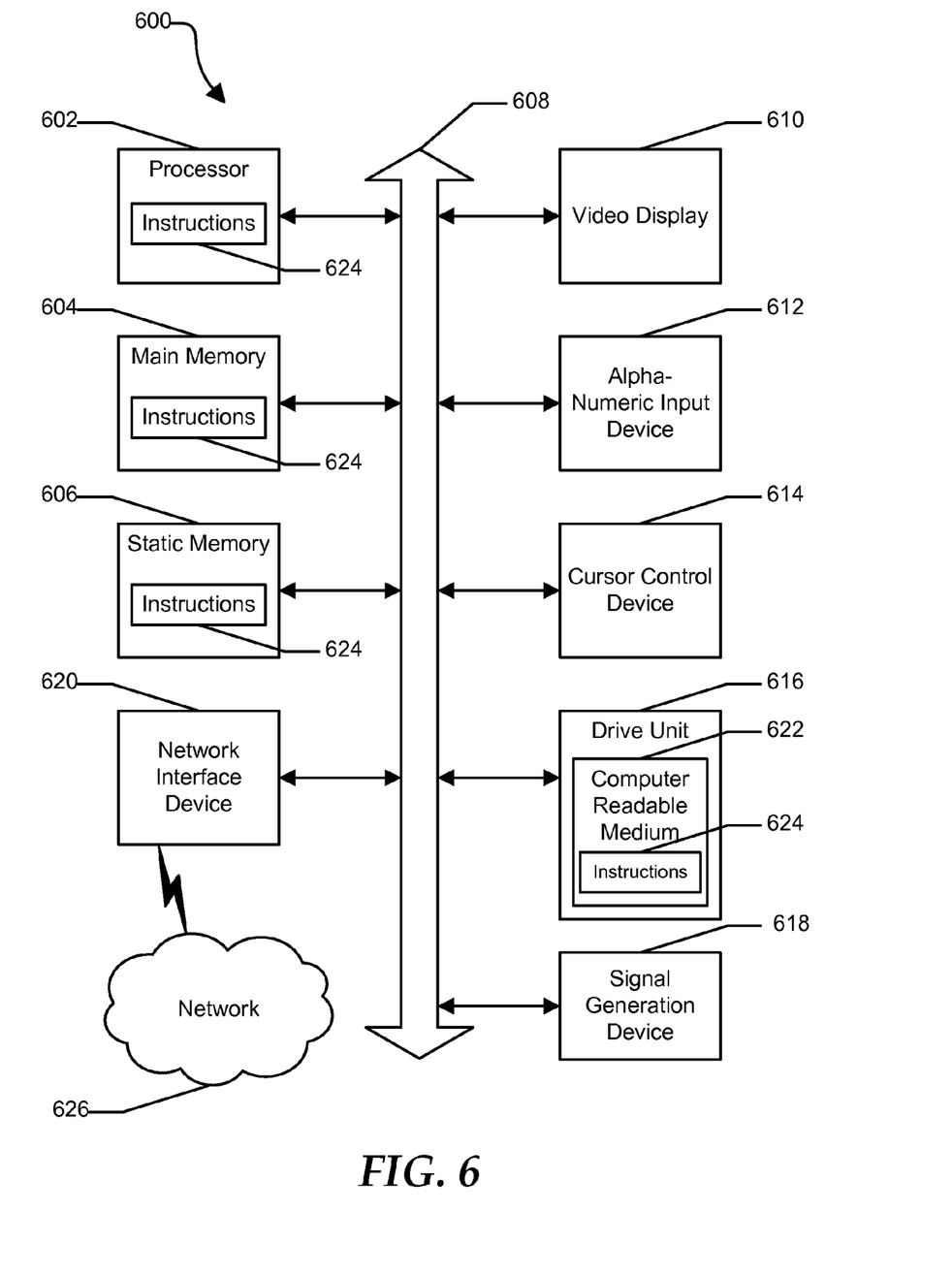
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set top box comprising:
   a storage device to store content, wherein the storage device is located in proximity to the set top box, and wherein the set top box is in a customer premises; and
   a processor coupled to the storage device, wherein execution of instructions by the processor causes the processor to perform operations, comprising:
   providing an electronic programming guide to available television programming, wherein the available television programming comprises previously-aired content that was broadcast to completion, currently-airing content, and to-be-aired content, and wherein the previously-aired content is presented in the electronic programming guide with a symbol that indicates the previously-aired content is stored in the storage device;
   receiving a selection indicating selected content;
   determining if the selected content is previously aired content, currently airing content, or to-be-aired content;
   determining if the selected content is stored in the storage device when the selected content is previously aired content;
   receiving the selected content from the storage device when the selected content is stored in the storage device;
   if the selected content is previously aired content, then requesting the selected content from a distribution server when the selected content is previously aired content and not stored in the storage device, wherein the distribution server is in a remote location from the customer premises where the set top box is located, wherein the selected content comprises captured content of a signal of a linear content provider stored by a capture module of the distribution server according to popularity of the captured content, age of the captured content, and proximity of the distribution server to the set top box; and
   if the selected content is to-be-aired content, then performing operations comprising:
   searching for an alternative source for the selected content;
   determining whether the alternative source is available;
   presenting a first option for viewing the selected content from the alternative source according to determining that the alternative source is available; and
   presenting a second option for setting a reminder for viewing the selected content when it is scheduled for airing, wherein the reminder causes the set-top box to automatically switch to the selected content at a time of airing.

2. The set top box of claim 1 wherein the symbol is presented adjacent to a title of the selected content.

3. The set top box of claim 1 wherein the processor further performs operations comprising automatically presenting the selected content when the selected content becomes available.

4. The set top box of claim 3 wherein execution of the instructions cause the processor to perform operations comprising searching for an alternate source when the selected content is to-be-aired content.

5. The set top box of claim 1 wherein execution of the instructions causes the processor to further perform operations comprising providing an option between playback from a current time and playback from a beginning when the selected content is currently-airing content.

6. A method, comprising:
providing, by a system comprising a processor, an electronic programming guide to available television programming, the available television programming including previously-aired content that is not currently airing, currently-airing content, and to-be-aired content;
receiving, by the system, a selection indicating selected content;
determining, by the system, if the selected content is previously aired content, currently airing content, or to-be-aired content;
if the selected content is previously aired content, then requesting, by the system, the selected content from a distribution server remotely located from the system when the selected content is previously aired content and the previously aired content is not stored in a local storage device of the system, wherein the selected content comprises captured content of a signal of a linear content provider stored by a capture module of the distribution server according to popularity of the captured content, age of the captured content, and proximity of the distribution server; and
if the selected content is to-be-aired content, then performing operations comprising:
searching for an alternative source for the selected content;
determining whether the alternative source is available;
presenting a first option for viewing the selected content from the alternative source according to determining that the alternative source is available; and
presenting a second option for setting a reminder for viewing the selected content when it is scheduled for airing, wherein the reminder causes a set-top box to automatically switch to the selected content at a time of airing.

7. The method of claim 6 further comprising storing, by the system, the selected content within the local storage device.

8. The method of claim 6 further comprising determining, by the system, if the selected content is stored in the local storage device, and retrieving, by the system, the selected content from the local storage device when the selected content is stored in the local storage device.

9. The method of claim 6 wherein a symbol is presented adjacent to a title of the selected content.

10. The method of claim 6 further comprising searching, by the system, for the alternate source when the selected content is to-be-aired content.

11. The method of claim 6 further comprising providing, by the system, an option between playback from a current time and playback from a beginning when the selected content is currently-airing content.

12. A tangible computer-readable storage device comprising instructions which, responsive to being executed by a processor of a set top box, cause the processor to perform operations comprising:
presenting an electronic programming guide indicating available television programming, wherein the available television programming comprises previously-aired content that was broadcast to completion, currently-airing content, and to-be-aired content, and wherein the previously-aired content is presented in the electronic programming guide with a symbol that indicates the previously-aired content is stored in a storage device that is connected with the set top box and that is in proximity to the set top box;
receiving a selection indicating selected content;
determining if the selected content is previously aired content, currently airing content, or to-be-aired content;
determining if the selected content is stored in the storage device when the selected content is previously aired content;
receiving the selected content from the storage device when the selected content is stored in the storage device;
if the selected content is previously aired content, then requesting the selected content from a distribution server when the selected content is previously aired content and not stored in the storage device, wherein the distribution server is in a remote location from customer premises where the set top box is located, wherein the selected content comprises captured content of a signal of a linear content provider stored by a capture module of the distribution server according to popularity of the captured content, age of the captured content, and proximity of the distribution server to the set top box; and
if the selected content is to-be-aired content, then performing operations comprising:
searching for an alternative source for the selected content;
determining whether the alternative source is available;
presenting a first option for viewing the selected content from the alternative source according to determining that the alternative source is available; and
presenting a second option for setting a reminder for viewing the selected content when it is scheduled for airing, wherein the reminder causes the set-top box to automatically switch to the selected content at a time of airing.

13. The tangible computer-readable storage device of claim 12, wherein the processor further performs operations comprising automatically presenting the selected content when the selected content becomes available.

14. The tangible computer-readable storage device of claim 12, wherein the operations further comprise searching for an alternate source when the selected content is to-be-aired content.

15. The tangible computer-readable storage device of claim 12, wherein the operations further comprise providing an option between playback from a current time and playback from a beginning when the selected content is currently-airing content.

* * * * *